Patented May 11, 1943

2,318,747

UNITED STATES PATENT OFFICE 2,318,747

PROVITAMIN A EXTRACTION PROCESS

Loran O. Buxton, Harrison, N. J., assignor to National Oil Products Company, Harrison, N. J., a corporation of New Jersey No Drawing. Application February 8, 1939,
Serial No. 255,219

9 Claims. (Cl. 167—81)

This invention relates to the concentration and purification of the unsaponifiable fraction of oils and fats and is directed to the purification and concentration of those oils and fats rich in vitamins and/or provitamins. In one of its more specific aspects, the invention is directed to the purification and concentration of the unsaponifiable fraction of vitamin and/or provitamin-rich vegetable fats and oils, and especially to the purification and concentration of the unsaponifiable fraction of palm oil or fat. In one of its other aspects, the invention is directed to novel vitamin and/or provitamin concentrates.

It has long been known that concentrated provitamin A may be obtained from palm oil or fat and that the same may be dissolved in a foreign edible carrier, such as corn oil, cottonseed oil, sesame oil or the like. However, it generally was not possible to obtain a provitamin A concentrate in said carrier, which exceeded about 3,000 gammas of provitamin A per gram of carrier.

Heretofore, the provitamin A fraction of palm oil or fat was concentrated by treating the oil or fat with an aqueous solution of caustic alkali to saponify the saponifiable fraction of the oil or fat. Then the entire mass was subjected to the action of a solvent to extract the unsaponifiable fraction thereof. The solvent was then distilled off, leaving behind the unsaponifiable fraction of provitamin A devoid of substantially all free fatty acids, saturated glycerides, slightly unsaturated triglycerides and highly unsaturated triglycerides as well as most of the nitrogeneous compounds which are originally part of said oil or fat.

The disadvantages of said prior art process are as follows:

1. The yield of provitamin A is relatively low.
2. The end product or provitamin A concentrate recovered is substantially free from the naturally occurring and highly unsaturated triglycerides, which are excellent carriers for provitamin A and are present in the original oil or fat.
3. The end product or provitamin A concentrate recovered is substantially free from the naturally occurring esterified sterols present in the original oil or fat. The naturally occurring esterified sterols are reacted upon by the alkali in the course of saponification to form soap and sterols in accordance with the following equation, where R' represents the sterol nucleus:

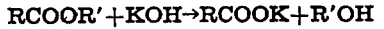

$$RCOOR' + KOH \rightarrow RCOOK + R'OH$$

The sterol reaction product R'OH is a very poor and inefficient carrier of provitamin A when compared with the naturally occurring esterified sterols and consequently serves no useful purpose in the concentrate and resides therein as an impurity.

4. The end product or provitamin A concentrate includes a part of the naturally occurring nitrogeneous compounds originally present in said fat or oil and these compounds are present in the concentrate either in their naturally occurring state or as degradation or reaction products brought about by the presence of the caustic alkali, and their presence in the concentrate tends to darken the concentrate and also tends to make the taste of the concentrate disagreeable and unpalatable.

5. The presence of the naturally occurring nitrogeneous compounds originally present in the fat or oil during the saponification step reduces the yield of the provitamin A and consequently reduces the efficiency, and during said step these compounds act, more or less, as buffers which absorb and/or adsorb or in some other manner take up some of the alkali, thus rendering the same unavailable for saponification, and as a result a large excess of alkali must be employed.

6. Most of the fatty acids and triglycerides naturally occurring in said oil or fat are highly saturated and therefore the soap formed by the reaction of the caustic alkali therewith is relatively hard, and consequently it is difficult to extract that portion of the unsaponifiable fraction that may have been coupled therewith in the course of saponification, and the presence of the naturally occurring or degraded nitrogeneous compounds renders the extraction even more difficult.

7. The concentrate obtained is partially liquid and partially solid.

8. Only a small quantity of the end product obtained may be dissolved in a gram of a foreign edible oil or fat.

An object of this invention is generally to eliminate the aforesaid disadvantages.

Another object of this invention is to provide a novel process for concentrating and refining materials rich in vitamins and/or provitamins.

Another object of this invention is to provide a novel and commercially practical process for refining and concentrating a vegetable oil or fat to obtain a novel unsaponifiable fraction.

Another object of my invention is to provide a novel process for purifying and concentrating the unsaponifiable fraction of palm oil or fat and carrot oil or fat.

Another object of the invention is to provide a novel unsaponifiable concentrate of a natural oil or fat.

Another object of this invention is to provide a novel provitamin A concentrate.

Other objects will in part be obvious and will in part appear hereinafter.

The invention accordingly comprises the several steps and the relation of one or more of such steps with respect to each of the others, and the composition possessing the features, properties and the relation of constituents, which are exemplified in the following detailed disclosure, and the scope of the invention will be indicated in the claims.

According to the invention, the oil or fat which may be a vegetable oil or the like is dissolved in a quantity of an organic solvent having a low solidification point. The solution is cooled to a predetermined temperature, whereupon the naturally occurring nitrogeneous compounds, the saturated triglycerides, the slightly unsaturated triglycerides and the saturated fatty acids solidify and separate out. The mixture is filtered to separate the solids therefrom and the filtrate is cooled to said predetermined temperature, whereupon more of these compounds solidify and this mixture also is filtered and the filtrate is again cooled for the same purpose. The cooling and filtering steps may be continued until no solidification or precipitation takes place upon cooling to said predetermined temperature. The residues, so obtained, are combined and dissolved in a fresh batch of solvent and this solution is cooled and filtered in the same manner in which the original solution was treated to extract therefrom that part of the unsaponifiable fraction that may have been coupled therewith. Generally but three or four cooling steps are carried out and the last filtrates are then combined and tested for free fatty acids. If the analysis indicates substantially no free fatty acid, the combined filtrates are heated to distill off all the solvent. And it will generally be found that if the oil or fat so treated originally contained a comparatively small percentage of free fatty acid, the combined filtrates, when analyzed, will be substantially devoid of free fatty acid. However, when the so treated oil or fat contained originally a comparatively high percentage of free fatty acids, the analysis of the combined filtrates will indicate the presence of free fatty acid in an amount such that the fatty acid should be removed. The concentration of that part of the oil or fat in the solvent is adjusted, if necessary, and then a stoichiometric quantity of aqueous caustic alkali is added thereto to neutralize the free fatty acid content thereof. A soap which floats on the solution is thus formed and is removed therefrom. The solution is heated to distill off the solvent therefrom.

The invention is especially applicable to those oils and fats rich in provitamin A, and particularly to the provitamin-rich vegetable oils or fats occurring in nature as palm oil, palm kernel oil, carrot oil and the like. The oil or fat is dissolved in a quantity of organic solvent to provide approximately a 10% solution of said oil therein. The solvent employed may be an organic solvent for said oil or fat, and is one preferably having a high vapor pressure as well as a low solidification point; and may be one or a combination of two or more of the following: ethylene dichloride, heptane, petroleum ether, acetone, benzine, diacetone alcohol and isopropanol. Since I prefer to employ ethylene dichloride, the invention will be described as employing the same as the solvent. The 10% solution of the provitamin A rich natural vegetable oil or fat in ethylene dichloride is cooled to a predetermined temperature of between $-20°$ to $-40°$ C. At said predetermined temperature, the nitrogeneous compounds, the saturated glycerides, the slightly unsaturated triglycerides, and the free fatty acids solidify and precipitate out. The solids are separated from said solution in any convenient manner, such as decantation or filtration and the solid free solution is again cooled to said predetermined temperature between $-20°$ and $-40°$ C., whereupon more of said compounds solidify and precipitate out of said solution. The solids are removed therefrom and the resultant solid free solution is again cooled to said predetermined temperature between $-20°$ C. and $-40°$ C., whereupon still more of said compounds may solidify and precipitate out of said solution, and the precipitate is removed from the solution.

The residues so obtained are combined and dissolved in a quantity of ethylene dichloride to provide a 10% solution of said residue in said ethylene dichloride. This solution is cooled to between $-20°$ C. to $-40°$ C. and the precipitate is removed therefrom. The resultant solid free solution is again cooled to between $-20°$ C. to $-40°$ C., the precipitate is removed therefrom and the resultant solution is again cooled to $-20°$ C. to $-40°$ C. and any precipitate is removed therefrom. The resultant solid free solution obtained is combined with the resultant solid free solution obtained after the third cooling and separation steps of the original solution of the oil or fat and ethylene dichloride. This combined solution is substantially free from all nitrogeneous compounds, all saturated and slightly unsaturated triglycerides and all saturated free fatty acids. This solution contains substantially all the natural esterified sterols, the highly unsaturated triglycerides, the provitamin A, and it may or may not contain any appreciable quantity of the unsaturated free fatty acids depending upon the concentration of said unsaturated free fatty acids present in the original oil or fat.

The combined resultant solid free solution obtained after the third cooling and separation steps have been carried out, is analysed for free fatty acid. If the original oil or fat, treated as above described, had a comparatively low free fatty acid concentration, the analysis of the solution after the third cooling and separation steps will indicate the absence of substantially all free fatty acid. If, however, the original oil or fat, treated as above described, had a comparatively high free fatty acid concentration, the analysis of the solution after the third cooling and separation steps will indicate the presence of free fatty acid in such quantity that the same should be removed therefrom. The solution is adjusted, if necessary, so that the concentration of the solute is about 10% of the ethylene dichloride solvent. Then the removal of free fatty acids may be effected by adding to said solution at room temperature a quantity of an aqueous solution of 35% to 50% caustic alkali, such as KOH. The quantity of caustic alkali addition is in stoichiometric proportions; that is, the quantity of caustic alkali is just sufficient to neutralize all the free fatty acids present in said solution, and, consequently, both the esterified sterols and the highly unsaturated triglycerides are unaffected by the caustic alkali addition. The so produced soap of the free fatty acids floats and is removed from the solution which now is substantially devoid of all free fatty acids.

When the solution is devoid of substantially all free fatty acids, whether it be produced by only the cooling and separation steps or by these steps together with the subsequent saponification and separation step, it may be treated in the customary manner to remove the solvent therefrom. The solution devoid of substantially all free fatty acids, is heated under vacuum and in the presence of an inert atmosphere to distill off all the ethylene dichloride solvent. The concentrate left behind can be characterized as follows:

1. It is devoid of substantially all the naturally occurring nitrogeneous compounds, saturated and unsaturated free fatty acids, saturated and slightly unsaturated triglycerides present in the original oil or fat.
2. It contains substantially all the naturally occurring provitamin A, esterified sterols and highly unsaturated triglycerides in the same state in which they were present in the original oil or fat.
3. It is liquid at room temperature.
4. It is clear and dark red in color and has a slight "woody" or "grainy" taste and odor.

If desired, the concentrate may be dissolved in a foreign edible carrier such as corn oil, sesame oil, peanut oil, cottonseed oil or the like and the concentration of the provitamin A in the foreign carrier may be greater than 3,000 gammas of provitamin A and as high as 10,000 gammas of provitamin A per gram of the foreign edible carrier. The solution so obtained is stable against separation and is clear.

Although the invention has been described in detail as applicable to the concentration and refinement of provitamin A, it also finds application in the treatment of any oil or fat whose unsaponifiable fraction is to be refined and concentrated by separating the same from the saponifiable fraction and the nitrogeneous components thereof. Among such oils or fats are wheat germ oil rich in vitamin E, soy bean oil, rice bran "foots" oil and the like.

For a fuller understanding of the nature and objects of the invention, reference should be had to the following examples which are given merely to further illustrate the invention and are not to be construed in a limiting sense, all parts given being by weight:

*Example I*

100 parts of crude palm oil containing 8% free fatty acids and 1800 gammas provitamin A (carotene) per gram were placed into a cooling vessel and 900 parts of ethylene dichloride were added thereto. The mixture was stirred thoroughly until a clear solution resulted. The solution was then cooled gradually to −20° C. to −30° C. The light colored fraction which solidified out and rose to the surface was removed by filtering. The filtrate was recooled to −20° C. to −30° C., after which a second fraction solidified out and was removed by filtering. The filtrate was recooled to the said temperature after which only a very small fraction separated out and was removed by filtering. The combined residues which comprises 92 parts of the original crude palm oil were dissolved in 800 parts of fresh ethylene dichloride, and the resulting clear solution cooled to −20° C. to −30° C. The mixture was then filtered and the filtrates combined. A small portion of the combined filtrates was freed of solvent and the free fatty acid content determined on the residue. The free fatty acid content was 0.9%. The solvent was removed from the combined filtrates by vacuum distillation in the presence of an inert atmosphere of nitrogen gas. The concentrate obtained contained 21,000 gammas of provitamin A (carotene) per gram. The yield was 8.5 parts and the free fatty acid value was 0.9%.

*Example II*

100 parts of crude palm oil containing 12% free fatty acids and 2200 gammas provitamin A (carotene) per gram were placed into a cooling container and 900 parts of heptane then added. The mixture was agitated by stirring until a clear solution resulted. The solution was then cooled gradually to −20° C. to −40° C., whereupon a light colored fraction solidified out. The mixture was then filtered and the filtrate recooled to −20° C. to −40° C., after which a second fraction solidified out and was removed by filtering. The filtrate was recooled to −20° C. to −40° C., after which a third and small fraction solidified out and was removed by filtering. The combined residues which comprised 88 parts of the original crude oil were dissolved in 800 parts of fresh heptane and the resulting solution cooled to −20° C. to −40° C., whereupon precipitation occurred. The mixture was filtered and all the filtrates combined. A small portion of the combined filtrates was freed of solvent and the residual oil analysed for free fatty acids. The free fatty acid content of the said oil was 1.3%. The solvent was removed from the combined filtrates by vacuum distillation in the presence of an inert atmosphere of nitrogen gas. The yield was 12.5 parts and the potency was 17,000 gammas of provitamin A per gram, while the free fatty acid value was 1.3%.

*Example III*

100 parts of crude palm oil containing 60% free fatty acids and 400 gammas provitamin A (carotene) per gram were placed into a cooling container and 900 parts of ethylene dichloride added. The mixture was then stirred until all the oil was completely dissolved therein. The solution was then cooled gradually to −20° C. to −30° C. with gentle stirring, whereupon a fraction solidified out. The mixture was then filtered and the filtrate recooled to −20° C. to −30° C., after which a second fraction solidified out and was removed by filtering. The filtrate was recooled to −20° C. to −30° C., after which another small fraction solidified out and was removed by filtering. The combined residues which comprises 86 parts of the original crude oil were dissolved in 800 parts of fresh ethylene dichloride and the resulting solution cooled to −20° C. to −30° C., whereupon heavy precipitation took place. The mixture was then filtered and all the filtrates combined. A small portion of the combined filtrates was freed of solvent and the residual oil analysed for free fatty acids. The free fatty acid content of the said residual oil was 70%. The concentration of the solution was adjusted to approximately 5–10% concentration of oil in solvent and the stoichiometric quantity of 45% aqueous KOH to neutralize just the free fatty acids was added. The mixture was stirred gently for 10 minutes. The soap rose to the surface and was removed by filtration. The solvent was removed from the resultant filtrate batch by vacuum distillation in the presence of an inert atmosphere of nitrogen gas. The concentrate so obtained contained 9,500 gammas provitamin A (carotene) per gram. The concentrate was a clear liquid free of solids. The yield was 4 parts and the free fatty acid value was 0.3%.

The term "fatty material" is used in the claims to denote oils, fats and waxes comprising predominantly glycerides of saturated or unsaturated fatty acids; these "fatty materials" may also contain appreciable amounts of free fatty acids.

Since certain changes in carrying out the above process and certain modifications in the composition which embody the invention may be made without departing from its scope, it is intended that all matter contained in the above description shall be interpreted as illustrative and not in a limiting sense.

It is also to be understood that the following claims are intended to cover all the generic and specific features of the invention herein described, and all statements of the scope of the invention, which as a matter of language might be said to fall therebetween.

Having described my invention, what I claim as new and desire to secure by Letters Patent, is:

1. A process for preparing a provitamin A extract from palm oil containing provitamin A, which comprises cooling a solution of said oil in an inert normally liquid organic solvent therefor to a temperature sufficiently low to cause free fatty acids and saturated glycerides, together with any nitrogenous compounds contained in the material, to solidify, and separating the solidified constituents from the remaining solution.

2. A process for preparing a provitamin A extract from palm oil containing provitamin A and a relatively high percentage of free fatty acids, which comprises cooling a solution of said oil in an inert normally liquid organic solvent therefor to a temperature sufficiently low to cause fatty acids and saturated glycerides, together with any nitrogenous compounds present in said material, to solidify, separating the solidified constituents from the remainder of the solution, and subjecting the solution to additional cooling and separating steps until a solution substantially free of saturated triglycerides and free fatty acids is obtained.

3. A process for preparing a provitamin A extract from palm oil containing provitamin A and a relatively high percentage of free fatty acids, which comprises cooling a solution of said oil in an inert normally liquid organic solvent therefor to a temperature sufficiently low to cause fatty acids and saturated glycerides, together with any nitrogenous compounds present in said material, to solidify, separating the solidified constituents from the remainder of the solution, neutralizing any excess free fatty acid remaining in the solution, and removing the soap thus formed from the solution.

4. A process for treating palm oil to recover a provitamin A extract therefrom, which comprises dissolving palm oil in ethylene dichloride, cooling said solution to a temperature between about $-20°$ C. and about $-40°$ C., and separating the solidified constituents from the solution.

5. A process for treating palm oil to recover a provitamin A extract therefrom, which comprises dissolving palm oil in ethylene dichloride, cooling said solution to a temperature between about $-20°$ C. and about $-40°$ C., separating the solidified constituents from the solution, and subjecting the solution to additional cooling and separating steps until the solution is substantially free of fatty acids and saturated triglycerides.

6. A process for treating palm oil to recover a provitamin A extract therefrom, which comprises dissolving palm oil in heptane, cooling said solution to a temperature between about $-20°$ C. and about $-40°$ C., and separating the solidified constituents from the solution.

7. A process for treating palm oil to recover a provitamin A extract therefrom, which comprises dissolving palm oil in heptane, cooling said solution to a temperature between about $-20°$ C. and about $-40°$ C., separating the solidified constituents from the solution, and subjecting the solution to additional cooling and separating steps until the solution is substantially free of fatty acids and saturated triglycerides.

8. A process for treating palm oil to recover a provitamin A extract therefrom, which comprises dissolving palm oil in acetone, cooling said solution to a temperature between about $-20°$ C. and about $-40°$ C., and separating the solidified constituents from the solution.

9. A process for treating palm oil to recover a provitamin A extract therefrom, which comprises dissolving palm oil in acetone, cooling said solution to a temperature between about $-20°$ C. and about $-40°$ C., separating the solidified constituents from the solution, and subjecting the solution to additional cooling and separating steps until the solution is substantially free of fatty acids and saturated triglycerides.

LORAN O. BUXTON.